INVENTOR.
ROBERT W. LANDEE
BY Moody and Phillips
ATTORNEYS

March 1, 1966 R. W. LANDEE 3,238,459
UNAMBIGUOUS LOCAL PHASE REFERENCE FOR DATA DETECTION
Filed Dec. 14, 1961 4 Sheets-Sheet 2
FIG 4
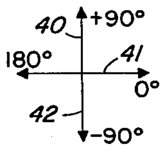
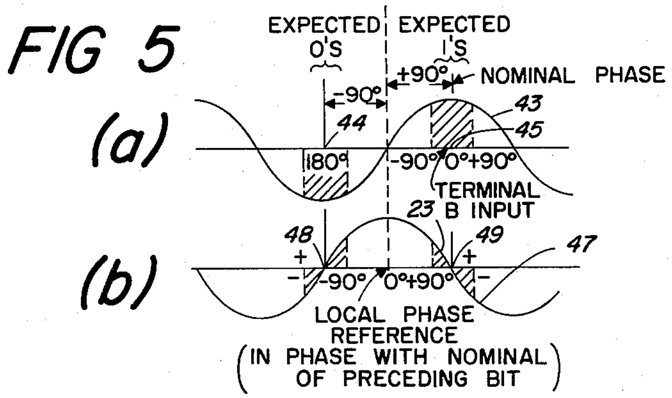
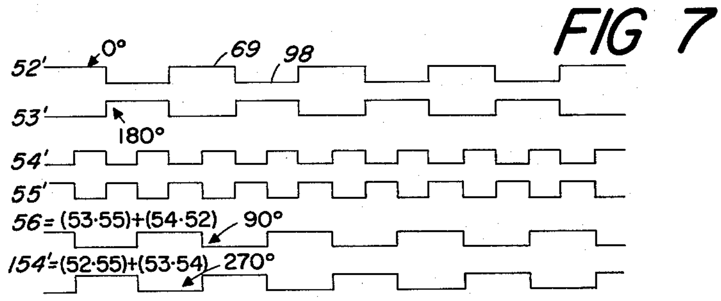
FIG 8
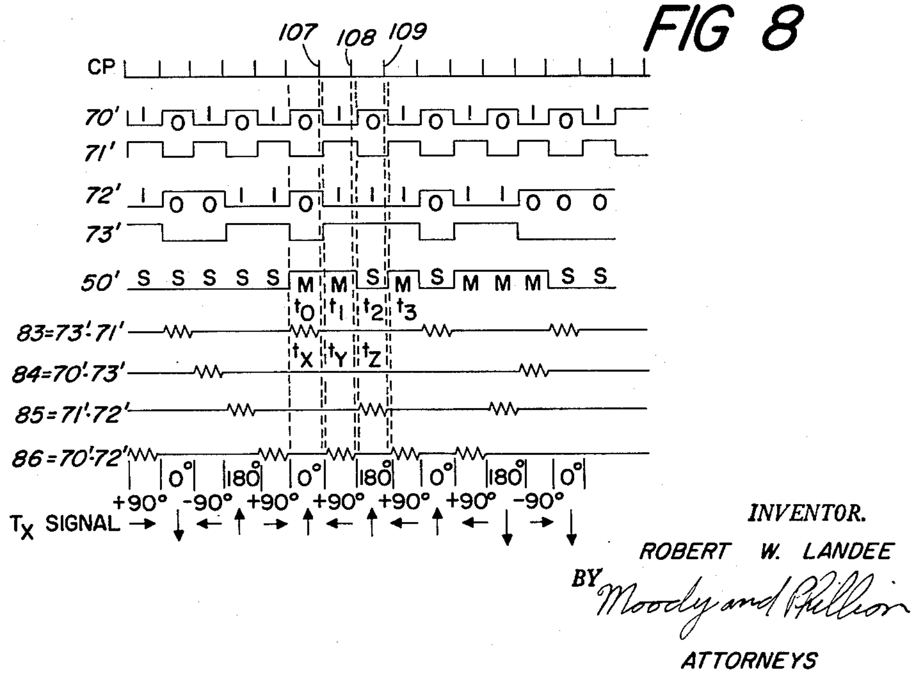
INVENTOR.
ROBERT W. LANDEE
BY Moody and Phillion
ATTORNEYS March 1, 1966 R. W. LANDEE 3,238,459

UNAMBIGUOUS LOCAL PHASE REFERENCE FOR DATA DETECTION

Filed Dec. 14, 1961 4 Sheets-Sheet 3

INVENTOR.
ROBERT W. LANDEE
BY Moody and Phillips
ATTORNEYS

March 1, 1966 R. W. LANDEE 3,238,459

UNAMBIGUOUS LOCAL PHASE REFERENCE FOR DATA DETECTION

Filed Dec. 14, 1961 4 Sheets-Sheet 4

INVENTOR.
ROBERT W. LANDEE
BY Moody and Phillips
ATTORNEYS

United States Patent Office 3,238,459 Patented Mar. 1, 1966

3,238,459
UNAMBIGUOUS LOCAL PHASE REFERENCE FOR DATA DETECTION

Robert W. Landee, Sherman Oaks, Calif., assignor to Collins Radio Company, Cedar Rapids, Iowa, a corporation of Iowa

Filed Dec. 14, 1961, Ser. No. 159,270
8 Claims. (Cl. 325—320)

This invention relates generally to means for receiving and decoding synchronous phased pulse information. More specifically, the invention relates to such a system employing the use of a locally generated phase memory.

In the prior art there are many means for encoding binary data on a single tone. One such method is to transmit the single tone in two phases, 0° and 180°, representing a binary bit "0" and a binary bit "1." In such a system the transmission of either a series of "0's" or a series of "1's" results in a continuous tone with no phase transitions. A system of this type falls in a general class of systems in which a *specific* tone phase is always a "0" and another tone phase is always a "1."

In data systems of the type mentioned above, wherein specific phase angles always refer to a "0" and a "1," respectively, it is necessary to derive a local phase reference for data detection. However, such locally generated phase reference may be 180° in error since there is nothing unique in the nature of the encode data which permits either the generation or phase correction of a reference tone at the receiver. Thus, while it is true that the received tone can be observed to have two phases which are 180° out of phase with one another, there is no way of distinguishing between the two phases and thereby identify one phase as representing a "0" and the other phase, 180° removed from the first phase, as representing a mark, for example. As a result. circuitry which either generates or phase corrects a local reference tone will as easily cause the local reference tone to lock upon one phase as upon the other. Consequently, it is necessary to examine the detected data for intelligence and, if incorrect, to shift the phase of the reference tone by 180°.

A second method of phase encoding a single channel of binary information on a single tone is to always either advance or retard the phase of the tone for each new information bit. It is an arbitrary choice as to whether a "0" or a "1" causes the phase to advance or retard. Also the discrete number of degrees that the tone phase is advanced or retarded is somewhat arbitrary. In the case of encoding a single channel of data, the phase shifts for optimum data deviation are +90° and −90°. It is to be noted that such phase shifts are with respect to the tone phase representing the preceding information bit. In contrast to the system employing a *specific* tone phase for a "0" or a "1" note that the absolute tone phase for any information bit may denote either a "0" or a "1," depending upon the data which has preceded.

In the data systems wherein the last data bit is used as a reference, it is only necessary to store the phase of the preceding bit long enough to provide the phase reference for the succeeding information bit. It is to be noted that there is no possibility of the phase reference being ambiguous when the phase of the last received information bit is used as the phase reference. One of the difficulties of employing the phase of the last received bit as a phase reference is the fact that said last received bit contains a certain amount of noise and phase perturbation due to transmission media property. Also, the bit being received contains a certain amount of noise and phase perturbation. Consequently, the total noise that must be dealt with by the receiver can be seen from the following expression:

$$(S_1+N_1)(S_2+N_2)=S_1S_2+S_1N_2+S_2N_1+N_1N_2 \quad (1)$$

where $S_1$ and $N_1$ are signal and noise strength of the stored bit and $S_2$ and $N_2$ are the signal and noise strength of the bit being received. Since $N_1$ and $N_2$ are of about the same magnitude and $S_1$ and $S_2$ are also about the same magnitude, this expression becomes $$S^2+2SN+N^2 \quad (2)$$

It is to be noted that the noise is of the second order.

In the case of a locally generated phase reference signal, the amount of noise that the receiver must deal with can be seen from the following expression:

$$S_1(S_2+N_2) \quad (3)$$

where $S_1$ represents the locally generated phase reference signal and $S_2$ and $N_2$ represent the signal and noise strength of the received bit. It can be seen that the noise is of the first order.

It is apparent that it would be advantageous to have a system wherein the phase reference signal was generated locally in the receiver to reduce noise and wherein the phase of the reference signal is derived from the phase of the preceding bit to eliminate ambiguity.

An object of the present invention is to provide a receiver for receiving synchronous phased pulse information and employing a locally generated phase reference signal wherein the possibility of phase ambiguity is eliminated.

A further object of the invention is a phased pulse data receiver employing a locally generated phase reference signal whose instantaneous phase is derived from the phase of the preceding received bit.

A further purpose of the invention is to provide a phased pulse data receiver of the type wherein the instantaneous reference phase for any given bit is derived from the phase of the preceding bit and in which the signal-to-noise ratio is increased over prior art systems.

A further object of the invention is the improvement of synchronous phased pulse data receivers, generally.

The basic philosophy of the invention is as follows. A local generator is provided with the output signal thereof being phase shifted to provide four signals having the same frequency as the received data frequency and being spaced 90° apart from each other so that said four signals may be said to have phases of 0° +90°, 180°, and −90° (270°). The received signal has been generated in such a manner that a mark or a space is always measured as an advance or retardation of 90° from the phase of the prior transmitted mark or space. In the present invention means are provided to select as a phase reference signal the particular one of the four output signals derived from the local oscillator whose phase coincides with the phase of the preceding received bit. (Synchronizing means is provided to maintain the phase of the selected one of the four local signals locked to the phase of the preceding received bit.) The bit currently being received will, by the very nature of its means of generation, either be advanced 90° or retarded 90° from the selected output signal of the local generator and thus will represent either a mark or a space.

Other means are provided to distinguish whether the received bit is leading or lagging the reference signal. Specifically, such other means comprises a 90° phase shift which advances the reference signal +90°, thus causing said reference signal to correspond to the currently received bit if such current bit is a mark and to be 180° out of phase with the current if the current bit is a space. Such phase detector means can then be employed to produce positive or negative D.C. voltage output in accordance with whether the advanced phase reference signal coincides or is 180° out of phase with the phase of the currently received bit.

Synchronizing means is provided to maintain the phase of the reference signal constant with respect to the phase of the data input signal. Such synchronization is readily obtained owing to the fact that the phase of the received input data signal should always be 90° removed from the phase of the advanced phase reference signal. It is true that such 90° may be either leading or lagging, yet nevertheless it is 90° and can be so maintained by means of a simple phase detector which provides an error signal which can be employed to control a resolver which, in turn, tunes the local oscillator.

The means for selecting the proper output signal of the four output signals of the local oscillator which are phased 90° apart, is generally as follows. The four signals are each supplied to an individual "and" gate, and a gate selecting means is provided to open the proper one of the four "and" gates. The gate selecting means comprises, in a preferred form of the invention, a binary counter consisting of two stages, and able to count up to four, which is the number of "and" gates to be controlled. Furthermore, the counter is designed so that it can count forwards or backwards consecutively. The four outputs of the two-stage binary counters are connected in matrix arrangement to the inputs of the four "and" gates such that at each of the four counts of the binary counter a selected one of the four "and" gates will be opened. (An opened gate is defined herein as one which will pass a signal therethrough.)

From the foregoing it will be apparent that from any given phase of the reference signal, the said reference signal will be caused to advance 90° at the end of the currently received bit of information if said currently received bit is a mark and will be caused to retard 90° at the end of the currently received bit if said currently received bit is a space. Consequently, the binary counter must be caused to count forward one step or backwards one step at the end of the currently received bit in accordance with whether the received bit is a mark or a space. To cause the binary counter to count in the correct direction there is provided a gating means to which there is supplied a high or low level D.C. signal indicative of the bit currently being received, that is, indicative of whether said current bit is a mark or a space. Near the end of the bit currently being received a clock pulse is supplied which causes the stages of the counter to change their conditions, i.e., to count either one step forward or one step backward in accordance with the polarity of the data input signal. Thus, the proper one of the four "and" gates to which the four output signals of the local oscillator is connected is opened to pass a phase reference signal whose phase is the same as that of the received bit which is just terminating. The selected phase reference signal will remain so selected until near the end of the next received input data bit at which time another clock pulse will occur and the cycle will repeat.

It is possible that the phase of any received bit might be so perturbated as to cause the binary counter of the gate selecting means to count in the wrong direction, thus causing the selection of an incorrect phase reference signal. As a result of such incorrect selection, in the next ensuing selection of the phase reference signal, a "0" will appear to the receiver as a "1" and a "1" will appear to the receiver as a "0," thus again causing the binary counter to count in the wrong direction. The last-mentioned erroneous count will, however, cancel out the first error with the result that the phase reference signal at the end of the second erroneous count will be the correct phase reference signal.

The above-mentioned and other objects and features of the invention will be more fully understood from the following detailed description thereof when read in conjunction with the drawings in which:

FIG. 4 is a vector diagram showing the relationship between the phase reference signal and the phase of a received mark or a space;

Figure 1:
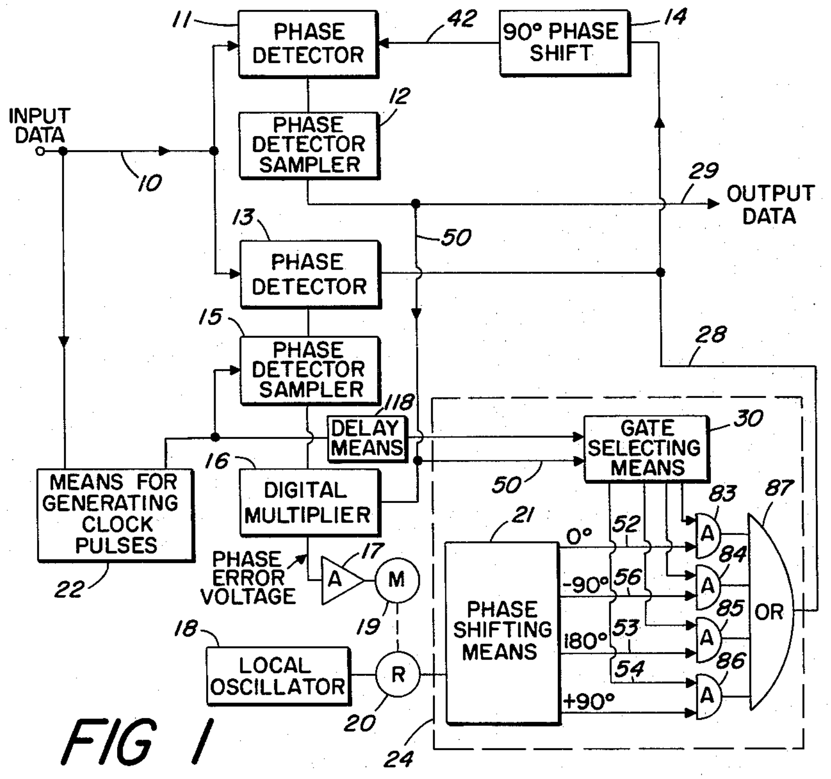
FIG. 1 represents a block diagram of the receiver.
Figure 6:
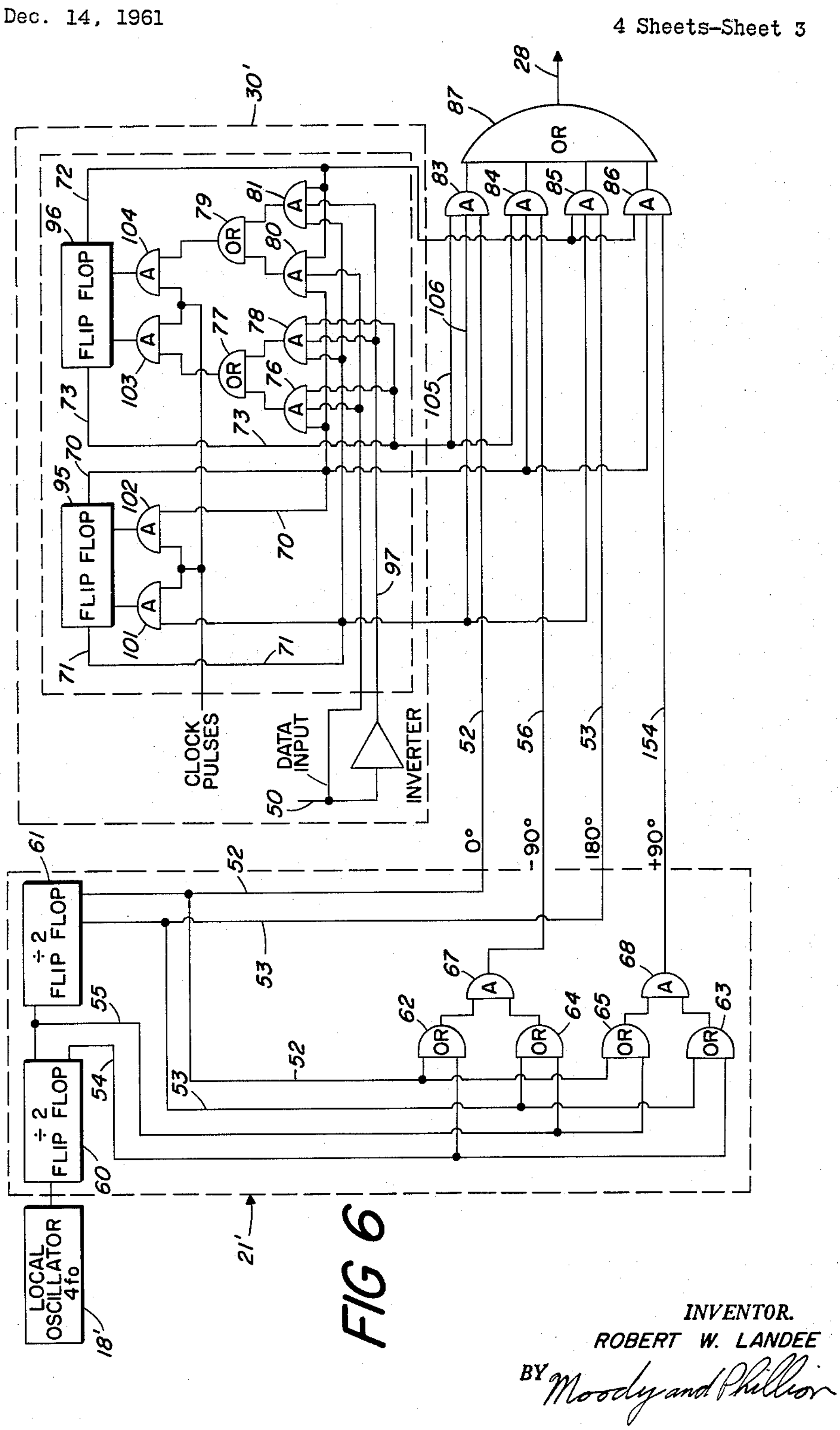
Figures 9, 10:
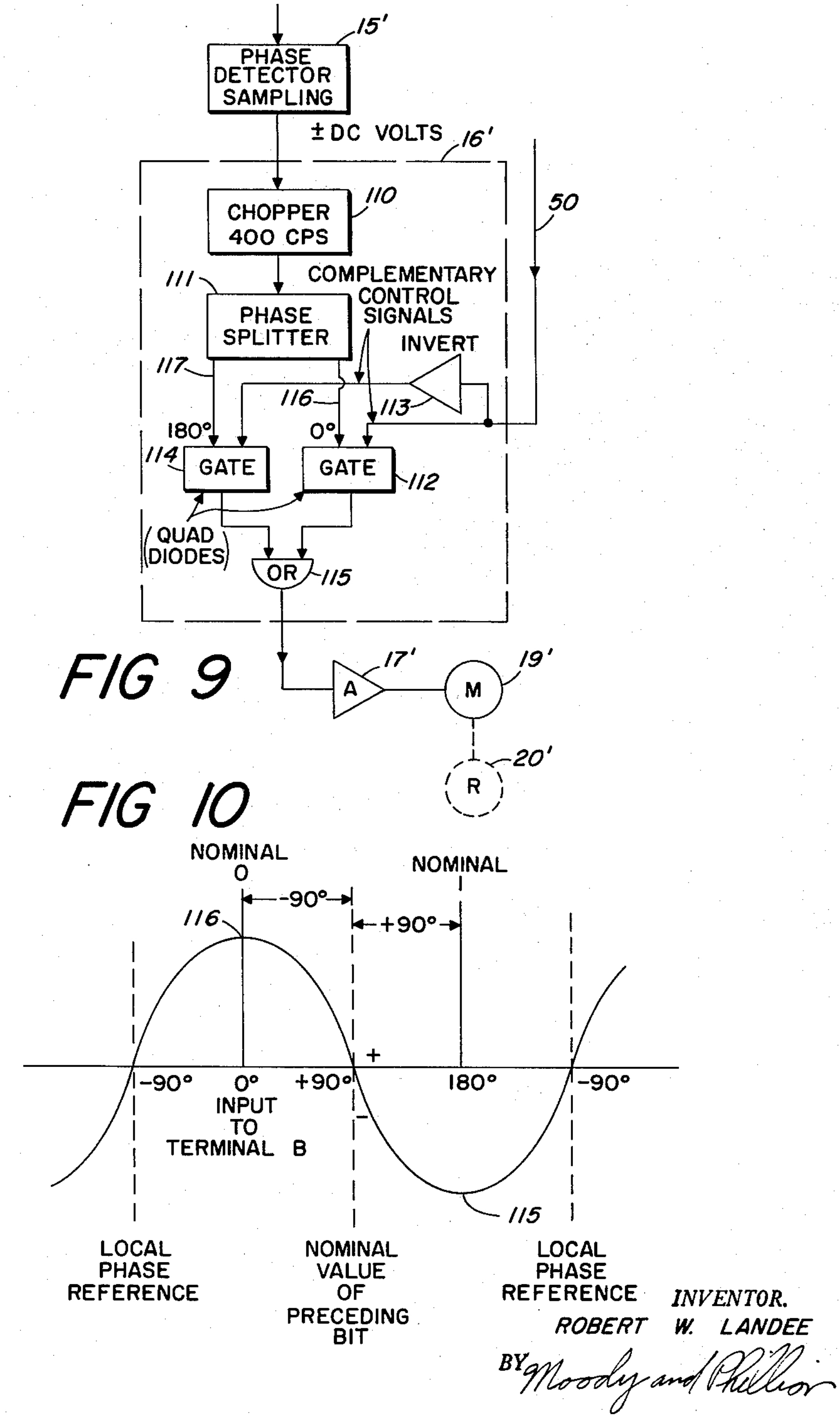

FIGS. 5(*a*) and 5(*b*) represent a characteristic output curve of phase detectors employed in FIG. 1;

FIG. 6 shows the means for splitting the output of the local oscillator into four signals whose phases are spaced 90° apart from each other; the four "and" gates to which each of the four outputs derived from the local oscillator is supplied, and the reversible binary counter means which is employed to select the proper one of the four gates;

FIG. 7 shows a series of voltage waveforms to facilitate an understanding of the phase splitting circuit of FIG. 6;

FIG. 8 is another series of voltage waveforms to facilitate an understanding of the reversible binary counter shown in FIG. 6;

FIG. 9 is an expanded block diagram of a portion of FIG. 1; and

FIG. 10 is a curve showing an error correcting function.

Figure 2:
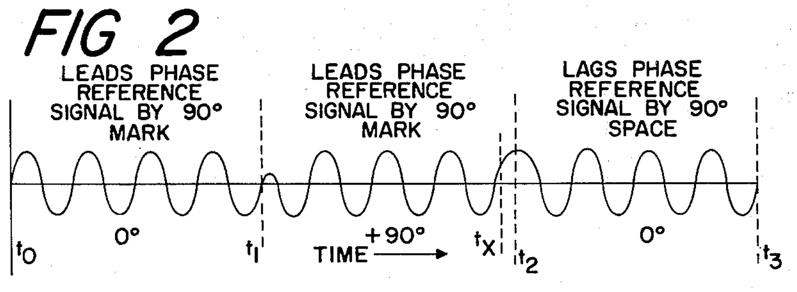
FIGS. 2 and 3 represent a typical phase relationship between two consecutively received bits of information.
Figure 3:
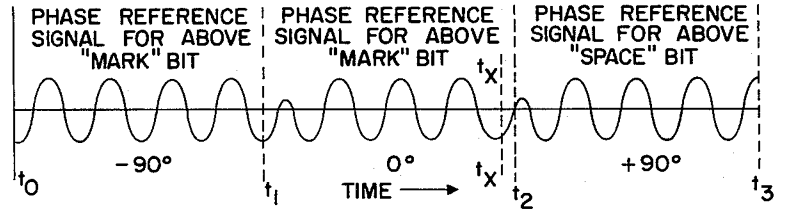

Before discussing the block diagram of FIG. 1 it appears appropriate to discuss in a rather general way the relationship between the phase of the received input signal and the phase of the reference signal. Three synchronous phased pulses are shown in FIG. 2; specifically, the phased pulses represent a mark between times $t_0$ and $t_1$, followed by a mark between times $t_1$ and $t_2$ and then followed by a space between times $t_2$ and $t_3$. Arbitrarily assume that the first mark, that is the mark existing between $t_0$ and $t_1$, has a phase of 0°. The phase reference signal produced locally in the receiver during this same interval of time as shown in FIG. 3 and has a phase lagging the phase of the mark by 90°. Such phase is denoted as being a −90°. At time $t_1$ the second mark is received and, as can be seen from FIG. 2, is advanced 90°, thus having a phase +90°. However, the phase reference signal between times $t_1$ and $t_2$ is now the phase of the first mark and is 0°. Thus, between the times $t_1$ and $t_2$ the phase of the input data bit leads the phase of the phase reference signal by 90°. At this time, then, in the vector diagram of FIG. 4 the vector 41 represents the phase of the phase reference signal and vector 40 represents the phase of the received input data signal which is a mark and, further, which leads the vector 41 by a positive 90°. It should be noted, perhaps, that the vector 42 would represent a space if a space were being received during this time.

At time $t_2$ the second mark terminates and a space is received by the receiver; the space existing between times $t_2$ and $t_3$. By definition, and as can be seen from FIG. 2, the phase of the space bit lags the phase of the previous mark by 90° and, consequently, has a phase of 0°. The phase reference signal between times $t_2$ and $t_3$ has a phase equal to the phase of the preceding mark (between times $t_1$ and $t_3$), which phase is a +90°. Thus the phase of the space bit can be seen to lag the phase of the phase reference signal during this time interval by 90°.

Referring to FIG. 4, the vector 40 would now represent the phase of the phase reference signal and the vector 41 would represent the phase of the received space bit.

For purposes of discussion of the structure of FIG. 1, assume that a mark data input signal and the phase reference signal, as shown between the times $t_1$ and $t_2$ of FIGS. 2 and 3, are present in the circuit of FIG. 1.

In FIG. 1 there is supplied a free running local oscillator 18 which supplies its output signal through a resolver 20 to a phase shift means 21 wherein there is produced four signals, all having the same frequency as the tone frequency of the received signal, but spaced apart 90° as indicated in the drawing. These four signals are supplied via leads 52, 56, 53, and 54 to "and" gates 83, 84, 85, and 86, respectively. By means of gate selecting means 30, which consists of a reversible binary counter and a gating means, one and only one of the gates 83 through 86 is caused to be opened, i.e., to pass a signal from phase shifting means 21.

Under the particular conditions assumed, that is with the mark bit between times $t_1$ and $t_2$ being received, the gate 83 is opened so that the "0" degree phase reference signal via lead 52 is passed through "and" gate 83, "or" gate 87, and lead 28 to the +90° phase shift circuit 14. The 90° phase phase shift circuit 14 will function to advance the phase of the phase reference signal by 90° so that it coincides in phase with the received mark signal. The phase detector 11 has an output characteristic, as shown in FIG. 5(*a*), wherein it can be seen that at point 45 where the phases of the two signals are coincident, the output of the phase detector 11 is a positive D.C. voltage. A phase detector sampler 12 functions to sample the output of the phase detector 11 at some time during the time interval $t_1$ and $t_2$ so that a positive D.C. pulse will appear on the output lead 29 indicating that a mark has been received. It might be noted at this time that if a space were being received the phase of the input data signal representing the space and the 90° advanced phase reference signal would be 180° out of phase when supplied to the phase detector 11. Thus, a minus D.C. voltage would be produced at the output phase detector 11, as shown at point 44 of FIG. 5(*a*).

It should further be observed that the timing of the phase detector sampler 12 is controlled by a master timing source 22, which also functions to control the timing of various other portions of the circuit of FIG. 1, as will be described in more detail hereinafter.

The phase reference signal, as shown between the times $t_1$ and $t_2$, is also supplied to phase detector 13, which also receives the data input signal from input lead 10.

Referring now to FIG. 5(*b*), there is shown the operating characteristics of the phase detector 13, which are substantially identical to that of phase detector 11, see FIG. 5(*a*). It should be noted, however, that the phase reference signal supplied to detector 13 has not been advanced 90° as is the phase reference signal supplied to phase detector 11. Consequently, the time scale of the operating characteristic of FIG. 5(*b*) is shifted 90° with respect to the time scale of the operating characteristics of FIG. 5(*a*).

The primary function of the phase detector 13 is to provide an output signal which is employed to maintain an exact phase relationship between the phase reference signal and the received data input signal at any given time. As discussed hereinbefore, the received data input signal may either lag or lead the phase reference signal by 90°. But there should always be a 90° phase difference between the two signals, whether leading or lagging. A phase detector sampling means 15 under control of the master timing source 22 functions to sample the output of phase detector 13 sometime during each time interval, as for example, between the times $t_1$ and $t_2$ of FIGS. 2 and 3. Referring to FIG. 5(*b*) for a more detailed explanation of the function of phase detector 13, it can be seen that if the phase relationship of the two signals is exactly 90°, the output signal of phase detector 13 is zero volts, as shown at the point 49 of FIG. 5(*b*). If, however, the phase difference is less than 90° the output of the phase detector 13 will be positive. Such a positive signal is supplied to a digital multiplier 16 (to be discussed later) and then to an amplifier 17 to energize a bidirectional motor 19. The motor 19 functions to drive a resolver 20. As is well known in the art, a resolver can be employed to shift the phase of a signal supplied thereto, or, if the resolver is continuously rotated, to shift the frequency of the supplied signal, said frequency being shifted one cycle for each complete rotation of the resolver. The motor is constructed in such a manner that it will rotate in the proper direction, in response to the output signal of the digital multiplier, to shift the phase of the output of the local oscillator to establish a 90° phase shift between the phase reference signal and the received data input signal. It is to be understood, of course, that when the phase of the output of the local oscillator is shifted, the phase of all of the four signals appearing on the output leads of the phase shifting means 21 will also be shifted.

If, however, a space is being received so that the phase detector 13 of FIG. 1 is operating around the point 48 of FIG. 5(*b*), it will be apparent that a positive error signal supplied to the motor 19 will cause said motor to rotate in the wrong direction. To correct this ambiguity there is provided in FIG. 1 the digital multiplier 16 which functions to invert the output of the phase detector sampling circuit 15 when a negative signal appears on the lead 50. Such negative signal will appear on the lead 50 only when a space is being received, as can be seen from the characteristic curve of FIG. 5(*a*).

As has been discussed briefly hereinbefore, the particular output signal of the four available output signals from phase shifting means 21 is selected to have a phase which is the same as the phase of the preceding received input data bit. This means that near the end of a bit interval the phase of the received input signal must be sampled by the gate selecting means 30 in order for the gate selecting means 30 to decide whether to advance or retard the present phase reference signal by 90°. If the bit being sampled happens to be a mark, then the phase reference signal which is to be used with the next received bit should be advanced 90°. On the other hand, if the received bit is a space, then the phase reference signal to be used in connection with the next received bit should be retarded 90°.

Referring to FIGS. 2 and 3, assume that the bit shown between times $t_1$ and $t_2$ is about to terminate as shown at time $t_x$. At approximately time $t_x$ a timing pulse from the master generator 22 will be supplied to the gate selecting means 30 through delay means 118, to energize said gate selecting means. Also at this time there will be present on the lead 50 of FIG. 1 a positive voltage indicating that a mark is being received at time $t_x$. The gate selecting means 30 will then function to close the "and" gate 83 and to open the "and" gate 86 to permit a phase reference signal with its phase advanced by 90° to pass through the "or" circuit 87 and to the lead 28. Such phase reference signal will then be used as a reference for the space signal received by the receiver between times $t_2$ and $t_3$.

The foregoing discussion can be more fully understood by means of the following discussion of FIGS. 6, 7, and 8 wherein the operation of the phase reference signal selecting means 24 of FIG. 1 is discussed in detail. First, there will be a discussion of the schematic block circuit whereby the output of the local oscillator is transformed by phase shifting means 21 into four signals of the same frequency but spaced 90° apart. Next, there will be described in detail the structure and operation of the gate selecting means 30 whereby the proper one of the gates 83 through 86 is selected.

In FIG. 6 the local oscillator 18' is constructed to produce an output signal having a frequency $4f_0$ where $f_0$ is the data tone frequency. The output of the local oscillator 18' is supplied to the divider 60 of phase shifting means 21' and then to divider 61 so that the output of divider 61 has the frequency $f_0$.

The output signals appearing on the output leads 54 and 55 of the divider circuit 60 are represented respectively by the curves 54' and 55' of FIG. 7. Similarly, the signals appearing on the output terminals 52 and 53 of the divider 61 are represented by the curves 52' and 53' of FIG. 7. By definition the curve 52' of FIG. 7 can be said to have a phase of 0°, and the curve 53' of FIG. 7 to have a phase of 180°. The aforementioned two signals are supplied directly to the gates 83 and 85 of FIG. 6.

In order to generate signals having a phase of +90° and −90° (270°), the "or" gates 62, 64, 65, and 63, and the "and" gates 67 and 68 are employed. It will be observed that the four output leads 54, 55, 52, and 53 from the dividers 60 and 61 are connected in matrix arrangement to the "or" gates 62 through 65.

The "or" gates 62 through 65 and the "and" gates 67 and 68 are constructed so that they are open only in the presence of a high level signal; a high level signal being defined, for example, by the level 69 of curve 52' of FIG. 7 and a low level signal being represented by the level 98 in curve 52'. Thus, in order to have an output from "and" gate 67 of FIG. 6, for example, it is necessary that at least one of the two leads connected to the "or" gate 62 carry a high level signal and at least one of the two leads connected to the "or" gate 64 carry a high level signal. Thus, the waveform 56 of FIG. 7, which represents the output of "and" gate 67, can be defined by the following expression:

$$E_{56}=(E_{53} \text{ or } E_{55}) \text{ and } (E_{54} \text{ or } E_{52})$$

wherein $E_{56}$, $E_{53}$, $E_{55}$, $E_{54}$, and $E_{52}$ represent high level signals, respectively, on the leads 56, 53, 55, 54, and 52. The resultant waveform which is shown by the curve 56' of FIG. 7 has a phase which is 90° advanced from the 0° phase of curve 52' of FIG. 7. In a similar manner, the waveform 154 of FIG. 7 is determined. Specifically, the curve 154 of FIG. 7 can be defined by the following expression:

$$E_{154}=(E_{52} \text{ or } E_{55}) \text{ and } (E_{53} \text{ or } E_{54})$$

Thus, there is supplied to the gates 83, 84, 85, and 86 four signals having a frequency equal to the bit rate of the received data and having phases 90° removed from each other.

A discussion of the gate selecting means 30' (comprising the reversible binary counter) shown in FIG. 6 will now be made. The four output signals from the phase shifting means 21' of FIG. 6 are supplied to the gates 83, 84, 85, and 86 via conductors 52, 56, 53, and 54. As discussed before, it is necessary to open the proper one of the gates 83 through 86 by means of the reversible binary counter contained within the dotted rectangle 30'. In order to be consistent with the example used in connection with FIGS. 2, 3, and 4 the operation of the reversible binary counter will be made in accordance with that portion of the curve of FIG. 8 between times $t_0$ and $t_3$ which shows the reception of a mark followed by a second mark and then followed by a space. It is believed that if the aforementioned segment of the curves of FIG. 8 is described in detail the remaining portion of the curves of FIG. 8 will become readily understandable. Assume that the conditions of the circuit of FIG. 6 are as shown between times $t_0$ and $t_1$ of FIG. 8. Under such conditions the gate 83 is open and the gates 84, 85, and 86 are closed. The gate 83 is opened owing to the condition of the two flip-flop circuits 95 and 96 which is as follows. In flip-flop circuit 95 the output lead 71 has a low level signal and the output lead 70 has a high level, as shown by curves 71' and 70', respectively, of FIG. 8. The output leads 72 and 73 of flip-flop circuit 96 are at their high and low levels, respectively, as indicated in curves 72' and 73', respectively, of FIG. 8. It is to be noted that the "and" gates 83 through 86 become opened only when both of the input leads thereto (excluding leads 52 through 54) are at their *low* level. From an examination of FIG. 6 it will be seen that only the input leads to gate 83 have low level signals thereon. Thus, only the 0° phase reference signal which is being supplied to the gate 83 will pass therethrough to the "or" gate 87 and thence to the lead 28. Such a signal represents a mark, as can be seen from the curve 50'.

It has been indicated that the selection of one of the gates 83 through 86 is determined by the voltage levels of the output leads of the binary counters 95 and 96. As can be seen from FIG. 6, the four output leads 71, 70, 73, and 72 of the binary counters 95 and 96 are connected in matrix arrangement to the "and" gates 83 through 86. As the flip-flop circuits count forwards or backwards the combinations of leads 70 through 73 bearing low level signals change so that different ones of the gates 83 through 86 are opened. In the operation of the reversible binary counter the flip-flop circuit 95 drives the flip-flop circuit 96. In other words each time the flip-flop 95 changes conditions twice, the flip-flop 96 will change its condition once. It can be seen from the curves 70' and 71' of FIG. 8 that flip-flop 95 changes state with each clock pulse CP of FIG. 8 supplied thereto. (The said clock pulses are derived from the generator 22 of FIG. 1.) More specifically, when the output lead 70 is at its high level, such high level output signal will be supplied to the input "and" gate 102. Thus, when the next clock pulse occurs the "and" gate 102 will pass said pulse to the flip-flop 95 and will cause it to change states so that the high level output signal is on the output lead 71 and the low level output signal is on the lead 70. Such high level output signal on the lead 71 will then be supplied to the "and" gate 101 at the input of flip-flop circuit 95. Thus, when the next clock pulse occurs the "and" gate 101 will function to pass said clock pulse to again reverse the condition of the flip-flop circuit.

The circuitry which controls whether the flip-flop counts forward or backward is composed of "and" gates 76, 78, 80, and 81, and "or" gates 77, and 79. It will be observed that the two "and" gates 76 and 78 have outputs connected to the "or" gate 77 and that the two "and" gates 80 and 81 have their outputs connected to the "or" gate 79. The "or" gates 77 and 79 are, in turn, respectively connected to input "and" gates 103 and 104 of the flip-flop circuit 96. Thus, when either "and" gate 76 or 78 is open, the input "and" gate 103 will function to pass a clock pulse when said clock pulse occurs, thus causing the flip-flop to assume a first of its two conditions. Similarly, when either of the "and" gates 80 or 81 is open it will permit the "and" gate 104 to pass a clock pulse when said clock pulse occurs, to cause the flip-flop 96 to assume the other of its conditions. Only one of the "and" gates 76, 78, 80, and 81 can be open at a given time, for reasons discussed below.

Each of the four gates 76 through 81 has three inputs thereto, all of which must be at the *high* level in order for the gate to be open. Each group of three input leads to any of the "and" gates 76 through 81 is comprised of three of the following four leads: the output leads 70 and 71 of the flip-flop 95; the data input lead 50; and the inverted data input lead 97. These four leads are connected in matrix arrangement to the inputs of gates 76 through 81 in such a manner that the binary counter will count forward or backward, depending upon whether the data bit currently being received is a mark or a space. The specific logic of the matrix connection of the aforementioned four leads to the gates 76 through 81 can be more fully understood with reference to the curves of FIG. 8 which have been discussed briefly hereinbefore and which will now be discussed further.

Between the times $t_0$ and $t_1$ a mark is being received on the data input lead 50 of FIG. 6. As discussed before, the signal on flip-flop output lead 72 is at its high level, as shown in curve 72' of FIG. 6, and the signal on the flip-flop output lead 70 is also at its high level, as shown in curve 70'. Tracing the flip-flop output leads 70 and 72 to a common gate it is found that the only common gate is "and" gate 80. The data input, as shown in curve 50', is also at its high level at this time so that the gate 80 is opened. Since "and" gate 80 is open the high level signal is passed therethrough and thence through the "or" gate 79 to the "and" gate 104 of flip-flop 96. Thus, when a clock pulse, such as clock pulse 107 of the curve CP of FIG. 8, occurs at time $t_x$, said clock pulse will pass through the "and" gate 104 and will change the condition of the flip-flop 96. Said change is shown in the curves 72' and 73' as occurring at time $t_1$. (It should be noted that while there is a definite time delay between $t_x$ and $t_1$, such time delay is quite short and need only be as long as is required to effectuate the change of state of flip-flop circuit 96.)

Also, at the time $t_1$ the flip-flop 95 changes state so that the high level signal appears on the output lead 71, as shown in curve 71' of FIG. 8.

Now, since low level signals control the gates 83' through 86' it can be seen that the gates to which the leads 70 and 72 are connected will be the gate which is opened. Examining FIG. 6, it can be seen that such gate is gate 86 which passes the +90° phase reference signal. During the previous time interval $t_0$ to $t_1$ the low level signals were present in flip-flop output leads 71 and 73, which were applied in common only to gate 83 to which the 0° phase reference signal is supplied.

The flip-flop leads containing the high level signal during the time interval $t_1$ to $t_2$ are leads 71 and 73, as shown in curves 71' and 73'. Such two leads are common only to gate 78 associated with flip-flop 96. However, an inverted mark signal is supplied to such gate through lead 97 during time interval $t_1$ to $t_2$. Since said inverted mark signal is a negative signal, the gate 78 will not be opened. Consequently, when the clock pulse 108 of curve CP occurs at time $t_y$ neither the "and" gate 103, nor the "and" gate 104 will be opened, and the flip-flop 96 will not change states. From curves 72' and 73' it can be seen that the flip-flop 96 has not changed states. However, the flip-flop 95 will change states as discussed hereinbefore.

Since the flip-flop 95 has changed states the low level signals will now appear on flip-flop output leads 71 and 72. The only reference phase signal selecting gate common to both leads 71 and 72 is gate 85, which now becomes open to the exclusion of the other three gates, thus permitting the 180° phase reference signal to pass.

The high level output signals of the flip-flop 95 and 96 between times $t_2$ and $t_3$ appear on gates 70 and 73 and are common only to the "and" gate 76 of associated flip-flop 96. However, the data signal supplied during this time interval is a space, which is a low level signal, as shown in curve 50' of FIG. 10. Consequently, the gate 76 is not opened and upon the occurrence of the clock pulse 109 at time $t_z$ neither the "and" gate 103 nor 104 will pass a pulse. Thus the flip-flop circuit 96 will remain unchanged at time $t_3$, as shown in curves 72' and 73'.

The particular phase reference signal selected by one of the gating circuits 83' through 86' is conducted further through the "or" circuit 87 to the lead 28', which corresponds to the lead 28 in the circuit of FIG. 1.

Referring now to the structure of FIG. 9, there is shown a block diagram of the digital multiplier 16 of FIG. 1 to which the output signal of phase detecting sampling means 15 is supplied. The purpose of the digital multiplier is to resolve the ambiguity present owing to the fact that the phase of signals representing marks and spaces during any bit interval would ordinarily lie 180° apart. Referring to FIG. 5(*b*), a received mark, or "1," and the phase reference signal ordinarily would cause the detector 13 to operate at the point 49 of the curve 47, whereas a received space, or "0," and the phase reference signal ordinarily would cause the detector 13 to operate at the point 48 on the curve 47. However, the points 48 and 49 are ideal operating points and represent a relation of exactly 90° between the phase of the received bit and the phase of the reference signal. Frequently there is a small deviation from this 90° phase spacing. Thus, in the case of a received mark, if the phase distance is less than 90°, there will be a positive output signal from the sampler 15 which will function through the multiplier 16 and the amplifier 17 to cause the motor 19 to rotate in a certain direction so that the resolver 20 will compensate for said deviation. However, if a space is being received and the phase shift is less than the desired 90°, the error signal will still ordinarily be positive, and will cause the motor to rotate in the wrong direction since a reverse direction of rotation is required to correct the last-mentioned phase deviation. In other words, the motor is required to rotate in a first direction to increase a leading phase and to rotate in the opposite direction to increase a lagging phase. The function of the multiplier 16' of FIG. 9 to resolve such ambiguity in the following manner.

In the case where a mark is being received there is a + D.C. signal on the lead 50 so that the gate 112 is opened, thus permitting the signal appearing in the output terminal 116 of the phase splitter 111 to pass through the gate 112 and the "or" circuit 115 and then to the amplifier 17'. Such a signal will have a phase determined by the polarity of the signal supplied to the 400 c.p.s. chopper 110. More specifically, if the D.C. signal supplied to the chopper 110 is negative the output signal therefrom will have a certain phase. On the other hand, if the D.C. signal supplied to the chopper 110 is positive, the output signal therefrom has a phase 180° removed from the first-mentioned phase. The motor 19' is constructed to respond to the signal received from gate 112 in such a manner as to rotate the resolver 20' in the proper direction to compensate for a deviation when a mark is being received.

When a space is being received there will be a negative D.C. voltage on the lead 50, due to the action of phase detector 11, so that the gate 112 will be closed and the gate 114 will be opened. Inverter 113 functions to invert the said negative signal, thus causing gate 114 to open. The phase splitter 111 is constructed to produce in its output terminal 117 a signal which is always 180° in phase displaced from the phase of the signal on lead 116. The effect of employing the 180° phase displaced signal appearing on the lead 117 is to invert the characteristic curve of FIG. 5(*b*) so that the motor 19 will rotate in a direction opposite to that in which it would rotate if the driving signal were derived through gate 112.

Due to an extreme perturbation of phase in a received bit, it is possible that the local phase reference signal would become 180° out of phase with the transmitted phase of the preceding bit. In FIG. 10 there is illustrated such a case wherein the local phase reference signal supplied to the phase detector 11 of FIG. 1 is 180° out of phase with respect to the nominal phase of the preceding bit. In such a case, if the currently received bit is a mark the output of the phase detector 11 would be a negative value as indicated at point 115 of FIG. 12. Similarly, if the bit currently being received is a space, the output of phase detector 11 would be a positive D.C. value instead of a negative D.C. value, which it should be.

The system will correct itself naturally by virtue of the following reasons. It can be seen from FIG. 10 that a transmitted "1," which is +90° with respect to the preceding bit, will appear as a "0" since it produces a negative output at the phase detector 11. Similarly, a transmitted "0," which is a −90° with respect to the preceding bit, will appear in error as a "1." In the first instance where a transmitted "1" was detected as a "0," the gate selector 30 will function to select a signal retarded in phase by 90°. Thus, the phase reference signal will be in phase with the last bit received, which is the correct condition for receiving additional data. For the instance of a transmitted "0" being received in error as a "1" for the initial conditions defined, the gate selecting means 30 will cause the output signal of the phase reference signal selecting means 24 to be advanced by 90°. Thus, the phase reference signal will be in phase with the last received bit which again is the correct condition for the detection of additional incoming data.

The principles described in this specification are not limited to a single channel of information. More specifically, such principles can be adapted for the reception of two or more channels of information by proper circuit design. Specific modified circuits for gate selecting means 30 and for phase shifting means 21 of FIG. 1 are shown and described in co-pending United States application, Serial No. 29,974, filed May 18, 1960 by Robert W. Landee and entitled "Instantaneous Phase Pulse Modulator" which application is incorporated by reference as a part of this specification. Further, appropriate changes in the phase detector 11 and phase detector sampling means 15 would be required, as well as in the means for synchronizing the local oscillator with the received data signal to accommodate for the increased number of channels. Such structure is described in co-pending United States application, Serial No. 838,960, filed September 9, 1959, by Donald L. Martin and entitled "Digital Phase-Pulse Detector," which is incorporated by reference as a part of this specification. Additional phase shifting circuitry under control of the currently received data signal can be employed to shift the phase of the selected phase reference signal before supplying said phase reference signal to the phase detector 13; thus always causing the currently received phased pulse signal and the phase shifted phase reference signal to be phased 90° apart.

It is to be noted that the forms of the invention shown and described herein are but preferred embodiments thereof and that various other changes and modifications may be made therein without departing from the spirit or the scope of the invention.

I claim:

1. In a time synchronous phased pulse data receiver constructed to receive data pulses consisting of a burst of pulses of first frequency $f_1$ and wherein a mark or a space is indicated by advancing or retarding the phase of a phased pulse by 90° with respect to the phase of the phased pulse received immediately prior thereto, said data pulses having a bit rate of a second frequency $f_2$, means for generating a local phase reference signal comprising generating means for generating four signals, all having the frequency $f_1$ of the received phased pulse data but phase-spaced apart 90° from each other, means for selecting one of said four output signals of said generating means, means for maintaining a predetermined phase relationship between the phased pulse being received and the selected output signal of said generating means, said selecting means responsive to the phase relationship of the phased pulse being received and the phase of the current selected output signal to respond to a timing pulse near the end of a phased pulse time interval to select the output signal of said generating means to be employed as the phase reference for the next received phased pulse and which will have the phase of the currently received phased pulse, and means responsive to the received data pulses for generating a timing pulse having a frequency equal to the bit rate $f_2$ for synchronizing said generating means with the bit rate of the received data pulses.

2. Means for generating a local phase reference signal in a pulsed data receiver in accordance with claim 1, in which said means for maintaining a predetermined phase relationship comprises phase error signal generating means including first phase detecting means and responsive to the output signals of said generating means and the currently received input phased pulse to produce an output error signal indicative of the degree and direction of phase error of the output signal of said generating means, and correcting means responsive to said output error signal to correct said phase error.

3. Means for generating a local phase reference signal in a phase pulsed data receiver in accordance with claim 2, comprising a 90° phase shifting circuit having its input circuit connected to the selected output terminal of said generator means, decoding means including a second phase detector means responsive to the output signal of said phase shifting circuit and the currently received input phased pulse signal to produce an output signal indicative of the type of encoded data.

4. Means for generating a local phase reference signal in a pulsed data receiver in accordance with claim 3, in which said generator means comprises signal producing means for producing an output signal having a frequency equal to twice the frequency of the phased pulses, frequency divider means constructed to divide by two the frequency of the output signal of said signal producing means, said frequency divider and said signal producing means each having two output terminals on which appear output signals having a phase relationship of 180°, two pairs of "or" gates with each "or" gate having two input leads, the input leads of said "or" gates being connected in matrix arrangement with the output leads of said frequency divider and said signal producing means, and a pair of "and" gates each having two input leads, the two input leads of each "and" gate being connected to "or" gates diagonally positioned in the said matrix arrangement, the four output signals of the generator means appearing on the two output leads of said divider means and the two output leads of said pair of "and" gates.

5. Means for generating a local phase reference signal in a pulsed data receiver in accordance with claim 4, in which said selecting means comprises a reversible two-stage binary counter comprised of a first and second bistable circuit each having two stable states, each bistable circuit further having two output terminals with output signals thereon having a phase relationship of 180°, said second bistable circuit being driven by said first bistable circuit, two pairs of "and" gates each having three input leads, means for inverting the output signal of said decoding means, means for connecting the four output terminals of said two bistable circuits, the output terminal from said decoding means and the output terminal from said means for inverting to the twelve input leads of the last-mentioned two pairs of "and" gates in matrix fashion, a pair of "or" gates each having two input terminals, the two input terminals of each "or" gate being individually connected to an output terminal of two of said last-mentioned "and" gates diagonally positioned in said matrix, means responsive to output signals from said "or" gates and to timing pulses to cause said reversible binary counter to count in a direction determined by the nature of the output signal from said decoding means, another double pair of "and" gates, each having three input leads, the four output terminals of said generating means being connected one each to an input lead of one of said last-mentioned double pair of "and" gates, the four output terminals of said two bistable circuits being connected in matrix fashion with the eight remaining input terminals of said last-mentioned double pair of "and" gates to selectively open only one of said gates.

6. Means for generating a local phase reference signal in a pulsed data receiver in accordance with claim 3, in which said means for maintaining a predetermined phase relationship comprises an ambiguity resolving means connected in series between said phase error signal generating means and said correcting means and responsive to a signal of a given polarity from said decoding means to invert the output signal from said phase error signal generating means.

7. Means for generating a local phase reference signal in a pulsed data receiver in accordance with claim 6, in which said generator means comprises signal producing means for producing an output signal having a frequency equal to twice the frequency of the phased pulses, frequency divider means constructed to divide by two the frequency of the output signal of said signal producing means, said frequency divider and said signal producing means each having two output terminals on which appear output signals having a phase relationship of 180°, two pairs of "or" gates with each "or" gate having two input leads, the input leads of said "or" gates being connected in matrix arrangement with the output leads of said frequency divider and said signal producing means, a pair of "and" gates each having two input leads, the two input leads of each "and" gate being connected to "or" gates diagonally positioned in the said matrix arrangement, the four output signals of the generator means appearing on the two output leads of said divider means and the two output leads of said pair of "and" gates.

8. Means for generating a local phase reference signal in a pulsed data receiver in accordance with claim 7, in which said selecting means comprises a reversible two-stage binary counter comprised of a first and a second bistable circuit each having two stable states, each bistable circuit further having two output terminals with output signals thereon having a phase relationship of 180°, said second bistable circuit being driven by said first bistable circuit, two pairs of "and" gates each having three input leads, means for inverting the output signal of said decoding means, means for connecting the four output terminals of said two bistable circuits, the output terminal from said decoding means and the output terminal from said means for inverting to the twelve input leads of the last-mentioned two pairs of "and" gates in matrix fashion, a pair of "or" gates each having two input terminals, the two input terminals of each "or" gate being individually connected to an output terminal of two of said last-mentioned "and" gates diagonally positioned in said matrix, means responsive to output signals from said "or" gates and to timing pulses to cause said reversible binary counter to count in a direction determined by the nature of the output signal from said decoding means, another double pair of "and" gates, each having three input leads, the four output terminals of said generating means being connected one each to an input lead of one of said last-mentioned double pair of "and" gates, the four output terminals of said two bistable circuits being connected in matrix fashion with the eight remaining input terminals of said last-mentioned double pair of "and" gates to selectively open only one of said gates.

References Cited by the Examiner

UNITED STATES PATENTS 3,049,673 8/1962 Barry -------------- 340—170

DAVID G. REDINBAUGH, *Primary Examiner.*